United States Patent
Suzuki et al.

(10) Patent No.: US 10,068,690 B2
(45) Date of Patent: *Sep. 4, 2018

(54) R-T-B BASED PERMANENT MAGNET

(71) Applicant: TDK CORPORATION, Tokyo (JP)

(72) Inventors: Kenichi Suzuki, Tokyo (JP); Yasushi Enokido, Tokyo (JP)

(73) Assignee: TDK CORPORATION, Tokyo (JP)

(*) Notice: Subject to any disclaimer, the term of this patent is extended or adjusted under 35 U.S.C. 154(b) by 520 days.

This patent is subject to a terminal disclaimer.

(21) Appl. No.: 14/664,676

(22) Filed: Mar. 20, 2015

(65) Prior Publication Data

US 2015/0279527 A1  Oct. 1, 2015

(30) Foreign Application Priority Data

Mar. 28, 2014 (JP) ................. 2014-068510

(51) Int. Cl.
*H01F 1/057* (2006.01)
*C22C 38/00* (2006.01)
*H02K 1/02* (2006.01)

(52) U.S. Cl.
CPC ........... *H01F 1/057* (2013.01); *C22C 38/002* (2013.01); *C22C 38/005* (2013.01);
(Continued)

(58) Field of Classification Search
USPC ...................................... 148/101
See application file for complete search history.

(56) References Cited

U.S. PATENT DOCUMENTS

| 5,127,970 A * | 7/1992 | Kim ................. B22F 9/023 148/101 |
| 2002/0062884 A1 | 5/2002 | Kaneko et al. |

(Continued)

FOREIGN PATENT DOCUMENTS

| JP | S5946008 A | 3/1984 |
| JP | 2002190404 A | 7/2002 |

(Continued)

OTHER PUBLICATIONS

Aug. 19, 2014 Office Action issued in Patent Application No. 2014-068510.

*Primary Examiner* — Colleen P Dunn
*Assistant Examiner* — Rajinder Bajwa
(74) *Attorney, Agent, or Firm* — Oliff PLC

(57) ABSTRACT

An R-T-B based permanent with the residual magnetic flux density Br2 satisfies the relationship of Br2/Br≥0.90, wherein the residual magnetic flux density Br2 is obtained after applying the external magnetic field of Hex and then applying an external magnetic field of 0.95 HcJ. Such a R-T-B based permanent magnet preferably contains main phase grains with a composition of $(R1_{1-x}R2_x)_2T_{14}B$ (R1 is rare earth element(s) composed of one or more elements selected from the group consisting of Pr, Nd, Sm, Eu, Gd, Tb, Dy, Ho, Er, Tm, Yb and Lu, R2 is element(s) containing at least one selected from the group consisting of Y, La and Ce, T is one or more transition metal elements including Fe or a combination of Fe and Co as essential elements, and $0.2 \leq x \leq 0.7$) and thus can be suitably used as a magnet with a variable magnetic force for a variable magnetic flux motor.

6 Claims, 1 Drawing Sheet

(52) U.S. Cl.
CPC .............. *H01F 1/0577* (2013.01); *H02K 1/02* (2013.01); *B22F 2998/10* (2013.01); *B22F 2999/00* (2013.01)

(56) References Cited

U.S. PATENT DOCUMENTS

| | | | |
|---|---|---|---|
| 2005/0098238 A1* | 5/2005 | Morimoto | B22F 1/0003 148/302 |
| 2005/0268993 A1* | 12/2005 | McCallum | H01F 1/057 148/302 |
| 2006/0048855 A1 | 3/2006 | Honkura et al. | |
| 2007/0071979 A1* | 3/2007 | Komuro | B22F 1/02 428/403 |
| 2014/0311287 A1 | 10/2014 | Enokido et al. | |

FOREIGN PATENT DOCUMENTS

| | | | |
|---|---|---|---|
| JP | 3871219 B2 | 1/2007 | |
| JP | 2009302262 A | 12/2009 | |
| JP | 2010034522 A | 2/2010 | |
| JP | 2010045068 A | 2/2010 | |
| JP | 5464289 B1 | 4/2014 | |

\* cited by examiner

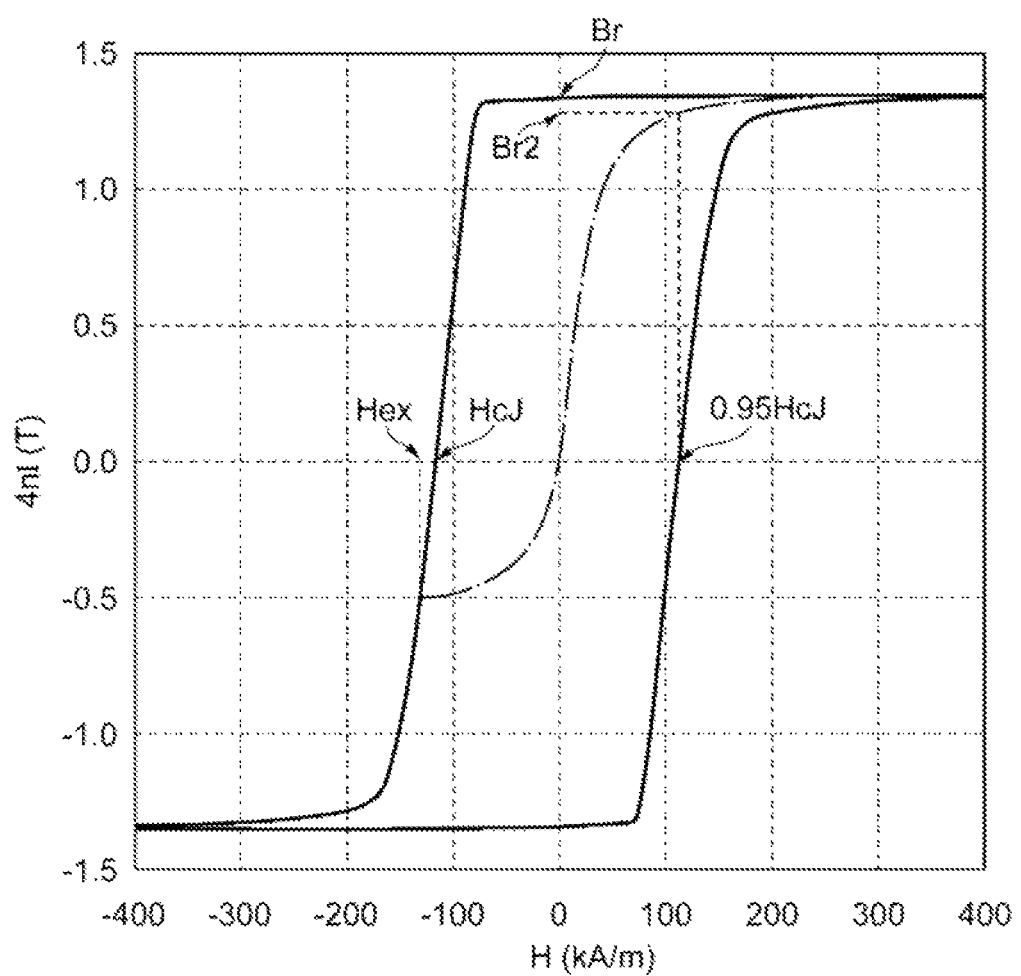

R-T-B BASED PERMANENT MAGNET

The present invention relates to an R-T-B based permanent magnet.

BACKGROUND

It is well known that the R-T-B based permanent magnet (R represents a rare earth element, T represents Fe or Fe with part of it replaced by Co, and B represents boron) with the tetragonal compound $R_2T_{14}B$ being its main phase has excellent magnetic properties and thus is a representative permanent magnet with high performance since it was invented in 1982 (Patent Document 1: JP S59-46008A).

The R-T-B based magnet with the rare earth element(s) R composed of Nd, Pr, Dy, Ho and/or Tb has a large magnetic anisotropy field Ha and is preferred as a material for the permanent magnet. The Nd—Fe—B based magnet with Nd being the rare earth element(s) R is widely used because it has a good balance among the saturation magnetization Is, the Curie temperature Tc and the magnetic anisotropy field Ha and is better in resource amount and corrosion resistance than R-T-B based permanent magnets using other rare earth elements R.

As a power unit used in consumer, industries and transportation equipments, the permanent magnet synchronous motor has been used. However, the permanent magnet synchronous motor in which the magnetic field generated by the permanent magnet is constant is hard to be driven as the induced voltage increases in proportion to the rotational speed. Thus, when the permanent magnet synchronous motor is operated in an intermediate/high speed region or under a low load, a field-weakening control which counterbalances the magnetic flux of the permanent magnet with the magnetic flux generated by the armature current is needed to make the induced voltage never exceed the supply voltage. As a result, a problem is there that the efficiency of the motor deteriorates.

In order to solve the technical problem mentioned above, a variable magnetic flux motor (hereinafter, referred to as variable magnetic flux motor) is developed which uses a magnet (a magnet with variable magnetic force), wherein, in the magnet, the magnetic force changes reversibly via an action of an external magnetic field. When the variable magnetic flux motor is operated in the intermediate/high speed region or under a low load, the deterioration of efficiency in the motor due to the field-weakening effect in the prior art can be inhibited by reducing the magnetic force of the magnet with variable magnetic force.

PATENT DOCUMENT

Patent Document 1: JP S59-46008A
Patent Document 2: JP 2010-34522A
Patent Document 3: JP 2009-302262A In the variable magnetic flux motor, a stationary magnet with a fixed magnetic force and a variable magnet with variable magnetic force are used in combination. In order to obtain a high output and a high efficiency of the variable magnetic flux motor, the variable magnet is required to provide a magnetic flux equal to that of the stationary magnet. However, the magnetization state needs to be controlled by a small external magnetic field which can be applied when the variable magnet is disposed inside a motor. In other words, magnetic properties such as a high residual magnetic flux density and a low coercivity are required in the variable magnet.

In Patent Document 2, a variable magnetic flux motor using a Sm—Co based permanent magnet as the variable magnet has been disclosed, and the efficiency of the motor can be improved by using an Nd—Fe—B based permanent magnet as the stationary magnet. However, the Sm—Co based permanent magnet used as the variable magnet has a residual magnetic flux density Br of about 1.0 T which is lower than the residual magnetic flux density of about 1.3 T in the Nd—Fe—B based permanent magnet used as the stationary magnet. This becomes the reason why the output and the efficiency of the motor deteriorate.

Patent Document 3 has disclosed a variable magnetic flux motor using an R-T-B based permanent magnet as the variable magnet, wherein, the R-T-B based permanent magnet contains Ce which is a rare earth element R as a necessity. As the R-T-B based permanent magnet having an equivalent structure with the Nd—Fe—B based permanent magnet which is a stationary magnet is used as the variable magnet, a residual magnetic flux density Br equal to that of the stationary magnet is also expected in the variable magnet. Nevertheless, in Patent Document 3, if Ce which is the rare earth element R is used as a necessity so as to control the coercivity at a preferred low level as a variable magnet, the residual magnetic flux density Br is around 0.80 to 1.25 T and thus does not reach the residual magnetic flux density Br of the stationary magnet of Nd—Fe—B based permanent magnet which is about 1.3 T.

Further, it is necessary to remagnetize the variable magnet when the variable magnet is operated at a low speed or under a high load to get back the magnetic force reduced in the intermediate/high speed region or under a low load. That is, it is quite necessary that the variable magnet can be remagnetized by a small external magnetic field which can be applied when the variable magnet is disposed inside a motor. When the magnetic force of the variable magnet is not sufficiently recovered through remagnetization, the residual magnetic flux density Br of the variable magnet gradually decreases during repeated demagnetization/magnetization operations.

SUMMARY

The present invention is made to solve the technical problem mentioned above. The present invention aims to provide a variable magnet with a high residual magnetic flux density, a low coercivity and an excellent remagnetization property, which is capable of maintaining a high efficiency in a wide rotational speed region and suitable for use in the variable magnetic flux motor.

The R-T-B based permanent magnet of the present invention is characterized in that the residual magnetic flux density Br is 1.2 T or more, the coercivity HcJ is 640 kA/m or less, the ratio Hex/HcJ of the external magnetic field Hex required for obtaining a residual magnetic flux density Br of 0 to the coercivity HcJ is 1.10 or less, and the residual magnetic flux density Br2 satisfies the relationship of Br2/Br≥0.90, wherein the residual magnetic flux density Br2 was obtained after applying the external magnetic field of Hex and then applying an external magnetic field of 0.95 HcJ. The R-T-B based permanent magnet preferably contains main phase grains with a composition of $(R1_{1-x}R2_x)_2T_{14}B$ (R1 is rare earth element(s) composed of one or more elements selected from the group consisting of Pr, Nd, Sm, Eu, Gd, Tb, Dy, Ho, Er, Tm, Yb and Lu, R2 is element(s) containing at least one selected from the group consisting of Y, La and Ce, T is one or more transition metal elements including Fe or a combination of Fe and Co as essential elements, and 0.2≤x≤0.7).

The inventors of the present invention found out that in the R-T-B based permanent magnet, the bigger the residual magnetic flux density Br2 is, the easier the remagnetization will be, wherein the residual magnetic flux density Br2 is obtained after applying the external magnetic field of Hex and then applying an external magnetic field of 0.95 HcJ, in which Hex is the magnetic field required for obtaining a residual magnetic flux density Br of 0. Further, the residual magnetic flux density Br will not decrease gradually even if the demagnetization/magnetization operations are repeated performed. Especially, if a specified amount of the rare earth element(s) R is made to contain at least one selected from the group consisting of Y, Ce and La and a thermal treatment suitable for the composition is applied, a permanent magnet will be obtained which can be suitably used as the variable magnet for the variable magnetic flux motor. Such a permanent magnet has a high residual magnetic flux density and a low coercivity, and its magnetization state can be controlled by providing a small external magnetic field.

The change of the magnetic force with respect to an external magnetic field (i.e. the behavior of magnetization switching) depends on the magnetization mechanism of the permanent magnet. The Nd—Fe—B based permanent magnet (a sintered magnet) obtained by a conventional powder metallurgy process has a nucleation-type coercivity mechanism. Specifically, a rather small external magnetic field may put the direction of magnetization in order (magnetization), however an external magnetic field with an intensity several times that of the coercivity is needed to reverse the magnetization once upon the magnetization is done (i.e. magnetized). Thus, such a magnet cannot be suitably used as a variable magnet whose magnetization state is changed by a small external magnetic field which can be applied when disposed inside a motor.

With respect to the permanent magnet having a pinning-type magnetization mechanism as $Sm_5Fe_{17}$, the slope of its magnetization curve (the recoil permeability) is small after an reversed magnetic field is applied, thus the residual magnetic flux density Br may decrease to about 0 if a reversed magnetic field with an intensity approximating to that of the coercivity is applied. In other words, the permanent magnet having a pinning-type magnetization mechanism can be suitably used as a variable magnet whose magnetization state will changed to be 0 via a small external magnetic field.

In order to magnetize the permanent magnet having a pinning-type magnetization mechanism which has been reversed by a reversed magnetic field again in the positive direction (remagnetization), a magnetic field with an intensity higher than the coercivity needs to be applied when the magnet is disposed inside the motor.

However, the magnetic field applied to the variable magnet may not be constant due to the instability of the current flowing in the winding coil of the motor and the position relation between the winding coil of the motor and the variable magnet. An external magnetic field with an intensity equivalent to the coercivity is supposed to be applied to the variable magnet, but the applied magnetic field is actually not sufficient. In this respect, a problem rises that the remagnetization is not sufficiently carried out and the properties of the motor deteriorate. Therefore, a variable magnet is needed in which a sufficient remagnetization can be actualized by applying an external magnetic field with an intensity lower than that of the coercivity.

In other words, in order to decrease the residual magnetic flux density Br to almost 0 (demagnetization) by a small external magnetic field which can be applied when disposed inside a motor, the pinning-type magnetization mechanism is preferable. On the other hand, in order to recover the residual magnetic flux density Br which has been decreased to almost 0 (magnetization), the nucleation-type magnetization mechanism is preferable.

In order to prepare a permanent magnet in which the ratio Hex/HcJ of the external magnetic field Hex required for obtaining a residual magnetic flux density Br of 0 to the coercivity HcJ is 1.10 or less, and the residual magnetic flux density Br2 satisfies the relationship of Br2/Br≥0.90, wherein the residual magnetic flux density Br2 was obtained after applying the external magnetic field of Hex and then applying an external magnetic field of 0.95 HcJ, the inventors have done specialized researches. As a result, they have found out that a magnet having both the nucleation-type magnetization mechanism for magnetization and the pinning-type magnetization mechanism for demagnetization can be obtained by adjusting the composition of the R-T-B based permanent magnet.

According to the present invention, if a specified amount of the rare earth element(s) R is composed of at least one selected from the group consisting of Y, Ce and La in the R-T-B based permanent magnet, a permanent magnet will be obtained which can be suitably used as the variable magnet for the variable magnetic flux motor, wherein the permanent magnet has a high residual magnetic flux density and a low coercivity, and its magnetization state can be controlled by providing a small external magnetic field.

BRIEF DESCRIPTION OF THE DRAWINGS

FIG. 1 is a magnetization-magnetic field curve in Comparative Example 3 of the present invention.

DETAILED DESCRIPTION OF EMBODIMENTS

Hereinafter, the preferable embodiments of the present invention will be described in detail. In addition, the embodiments do not limit the invention but are only examples, and all the features and the combinations thereof recited in the embodiments are not necessarily limited to the substantive contents of the invention.

The R-T-B based permanent magnet of the present invention is characterized in that the residual magnetic flux density Br is 1.2 T or more, the coercivity HcJ is 640 kA/m or less, the ratio Hex/HcJ of the external magnetic field Hex required for obtaining a residual magnetic flux density Br of 0 to the coercivity HcJ is 1.10 or less, and the residual magnetic flux density Br2 satisfies the relationship of Br2/Br≥0.90, wherein the residual magnetic flux density Br2 was obtained after applying the external magnetic field of Hex and then applying an external magnetic field of 0.95 HcJ. The R-T-B based permanent magnet preferably contains main phase grains with a composition of $(R1_{1-x}R2_x)_2T_{14}B$ (R1 is rare earth element(s) composed of one or more elements selected from the group consisting of Pr, Nd, Sm, Eu, Gd, Tb, Dy, Ho, Er, Tm, Yb and Lu, R2 is element(s) containing at least one selected from the group consisting of Y, La and Ce, T is one or more transition metal elements including Fe or a combination of Fe and Co as essential elements, and 0.2≤x≤0.7).

In the present embodiment, R1 is rare earth element(s) composed of one or more elements selected from the group consisting of Pr, Nd, Sm, Eu, Gd, Tb, Dy, Ho, Er, Tm, Yb and Lu.

In the present embodiment, R2 is rare earth element(s) composed of one or more elements selected from the group consisting of Y, La and Ce.

In the present embodiment, the amount x of R2 in the composition of the main phase grains satisfies $0.2 \leq x \leq 0.7$. As x increases, only the coercivity HcJ decreases while the residual magnetic flux density Br is approximately maintained. The inventors of the present invention suppose that the magneto crystalline anisotropy in the sample decreases as the amount of R2 increases. However, if x exceeds 0.7, the residual magnetic flux density Br will significantly decrease and the magnetic flux obtained as the magnet for the motor also decreased.

In the present embodiment, part of B can be replaced by C. The amount of C to replace B is preferred to be 10 atomic % or less relative to B.

In the present embodiment, T as the balance of the composition is one or more transition metal elements including Fe or a combination of Fe and Co. The amount of Co is preferably 0 atomic % or more and 10 atomic % or less relative to the amount of T. With the increase of the amount of Co, the Curie temperature can be increased and the decrease of the coercivity relative to the increase of temperature can be inhibited to be small. Further, the corrosion resistance of the rare earth based permanent magnet can be improved by increasing the amount of Co.

Hereinafter, the preferable example of the preparation method in the present invention will be described.

In the preparation of the R-T-B based permanent magnet in the present embodiment, the alloy raw material(s) will be prepared first with which an R-T-B based magnet with the desired composition can be obtained. The alloy raw material(s) can be prepared by the strip casting method or other well known melting methods under vacuum or at an inert atmosphere, preferably at Ar atmosphere. In the strip casting method, the molten metal obtained by melting the starting metal(s) at a non-oxidative atmosphere such as Ar atmosphere is sprayed to the surface of the rotating roll. The molten metal quenched on the roll will be condensed into a thin plate or a sheet (a scale-like shape). The quenched and condensed alloy is provided with a dendritic structure formed by the $R_2T_{14}B$ crystals which are the main phase grains with a grain size of 1 to 50 μm and the R-rich grain boundary phase grains. The method for preparing the alloy raw material is not limited to the strip casting method, and the alloy raw material can also be obtained by melting methods such as the high frequency induction melting method. Further, in order to prevent the segregation from happening after the melting process, for example, the molten metal can be poured on a water cooled copper plate so as to be solidified. Also, the alloy obtained by the reduction diffusion method can be used as the alloy raw material.

In the case of obtaining the R-T-B based permanent magnet in the present invention, for the alloy raw materials, substantially, the so-called single-alloy method for manufacturing a magnet from alloy of one kind of metal may be used, but the so-called mixing method may also be used, which uses a main phase alloy and a alloy contributing to the formation of the grain boundary effectively. In the mixing method, the main phase alloy (low-R alloy) has the main phase grains (i.e., $R_2T_{14}B$ crystals) as the main part while the alloy contributing to the formation of the grain boundary effectively (high-R alloy) contains more R than the low-R alloy.

The alloy raw material is subjected to a hydrogen adsorbing process. The alloy raw material was embrittled via hydrogen adsorption and will be easily pulverized in the following pulverization process. On the other hand, in the alloy raw material composed of the main phase grains and the grain boundary phase grains, cracks will be generated due to the difference between the amounts of the adsorbed hydrogen (i.e., the difference of the specific volumetric dilatations) of the main phases and the grain boundary phases, and the alloy raw material will be easily pulverized in the following pulverization process. The lower the temperature is, the higher the amount of hydrogen can be absorbed by the alloy raw material is. Thus, it will be effective to perform the hydrogen adsorbing process at a lower temperature to make the pulverization process easier. However, there is a problem in the preparation that a long time is required if the hydrogen adsorption is performed at a low temperature, so the alloy raw material is usually heated and then kept at about 200 to 400° C. in the hydrogen adsorbing process. If the alloy raw material is heated and then kept at a temperature of 700° C. or higher, the amount of adsorbed hydrogen will sharply increase. This is due to the disproportionation reaction in which the main phase $Nd_2Fe_{14}B$ is decomposed into three phases, i.e., $NdH_2$, $Fe_2B$ and Fe. There is an HDDR (Hydrogeneration•Decomposition•Desorption•Recombination) method which takes advantage of such a phenomena to micronize the crystal grains so as to provide a powder with high coercivity. In the present embodiment, the temperature at which the alloy raw material is heated and kept in the hydrogen adsorbing process will vary according to the composition of the alloy raw material but goes within the range of 600 to 800° C. The inventors of the present invention considered that if the temperature in the hydrogen adsorbing process is controlled within the range mentioned above, the disproportionation reaction occurs only in part of the alloy raw material, which is good for the low coercivity due to the heterogeneity of the structure and is also good for the pinning of the magnetization mechanism due to the generation of the pin phases.

The alloy raw material after the hydrogen adsorption is subjected to a hydrogen-releasing process. The hydrogen-releasing process is performed under vacuum or at an inert atmosphere with a controlled pressure. The desorption and recombination processes following the hydrogenation and decomposition processes in the HDDR method are extremely important for a high coercivity. However, the present invention aims to provide a permanent magnet whose magnetization state can be controlled by a small external magnetic field, so the hydrogen-releasing process does not need to be strictly controlled as that in the HDDR method. In the present embodiment, the temperature at which the alloy raw material is heated and kept in the hydrogen-releasing process will vary depending on the composition of the alloy raw material but is within the range of 650 to 850° C. The desorption and recombination processes are performed and $Nd_2Fe_{14}B$ is generated from the three phases of $NdH_2$, $Fe_2B$ and Fe while the temperature in the hydrogen-releasing process is controlled to be within the range mentioned above and the partial pressure of hydrogen is reduced in the atmosphere. The inventors of the present invention think that during the generation of $Nd_2Fe_{14}B$ via the desorption and recombination reactions, the incomplete reaction leads to the remain of heterogeneous phases or defects, which is good for the low coercivity and the pinning of the magnetization mechanism due to the generation of the pin phases. In another respect, it will be effective to make the following pulverization process easier by carrying out the hydrogen adsorption against the alloy raw material at a temperature where the hydrogenation and decomposition reactions will not initiate (especially at a low temperature which aims to increase the amount of the adsorbed hydrogen) after the $Nd_2Fe_{14}B$ is generated via the desorption and recombination reactions in the hydrogen-releasing process. In this case, although the alloy raw material is subjected to the pulverization process when hydrogen has been adsorbed to it, there is no problem because the adsorbed hydrogen is released during the early stage of the sintering process when the temperature rises.

The alloy raw material after the hydrogen-releasing process is subjected to a coarse pulverization process. The alloy raw material is pulverized to have a particle size of several hundreds of microns by a stamp mill, a jaw crusher, a Brown mill or the like so as to provide a coarsely pulverized powder. Further, the coarse pulverization process is preferably carried out at an inert atmosphere. If the alloy raw material after the hydrogen adsorbing process and the hydrogen-releasing process almost has the desired particle size, the coarse pulverization process can be omitted.

The coarsely pulverized powder is subjected to a fine pulverization process. The coarsely pulverized powder is pulverized to have an average particle size of 1 to 5 µm by a jet mill, a wet pulverizer (a ball mill, an attritor) or the like so as to provide a finely pulverized powder. The jet mill ejects a gas with a high pressure via a narrow nozzle so as to provide a gas flow with a high speed by which the coarsely pulverized powder is accelerated and then hit each other to perform the pulverization. The pulverized powder can be prevented from oxidizing by using an inert gas as the working gas. The wet pulverizer provides the media in the dispersion medium and the pulverized powder with kinetic energies and then pulverizes the pulverized powder. The oxidation of the pulverized powder can be inhibited by selecting an appropriate dispersion medium.

The finely pulverized powder is subjected to a molding process in a magnetic field. In the molding process in a magnetic field, the molding pressure may be set to be in a range of 0.3 to 3 ton/cm$^2$ (30 to 300 MPa). The molding pressure can be constant or incremental or degressive from the start to the end of the molding process. Otherwise, the pressure can be randomly changed. The lower the molding pressure is, the better the orientation is. However, if the molding pressure is much too low, the strength of the molded body will be insufficient, which will cause problems in the handling. Thus, the molding pressure is to be selected within the range mentioned above. The molded body obtained in the molding process in a magnetic field will usually have a final relative density of 40 to 60%. The applied magnetic field can be made to be around 960 to 1600 kA/m (12 to 20 kOe). The applied magnetic field is not limited to be a static magnetic field. A pulsed magnetic field can also be used. Further, the static magnetic field and the pulsed magnetic field can be used in combination.

During the fine pulverization, about 0.01 to 0.3 wt % of an fatty acid or an derivative of an fatty acid or an hydrocarbon may be added to improve the lubrication and the orientation in the molding process such as zinc stearate, calcium stearate, aluminum stearate, octadecanamide, oleamide, ethylene-bis-isostearic acid amide (all of which are stearic acid based or oleic acid based compounds), paraffin and naphthalene (which two are hydrocarbons) or the like.

The molded body is subjected to a sintering process. The sintering process is performed under vacuum or at an inert atmosphere. The temperature and the duration for the sintering process need to be adjusted depending on various conditions such as the composition, the pulverization method, the average particle size, and the distribution of particle size or the like. Nevertheless, the process may be performed at a temperature of approximately 1000 to 1200° C. for 2 to 20 hours.

It is well known that a permanent magnet with a high residual magnetic flux density and a low coercivity can be obtained by elevating the temperature and prolonging the duration in the sintering process. However, the decrease of coercivity in the sintered body occurred during the sintering process with a high temperature and a long time is due to the coarse crystal gains. Further, an external magnetic field with an intensity several times that of the coercivity is required for the magnetization switching, so the magnetization state cannot be controlled by a small external magnetic field. In other words, the permanent magnet with a high residual magnetic flux density and a low coercivity obtained by long-lasting sintering process at a high temperature is not suitable to be used as the variable magnet for the variable magnetic flux motor.

After sintered, the obtained sintered body is subjected to an aging treatment. The aging treatment is effective in adjusting the coercivity, but the coercivity which can be adjusted in the aging treatment is about 400 kA/m. Thus, it is difficult to decrease the coercivity of the Nd—Fe—B based permanent magnet (1000 kA/m or more) to a level suitable for the variable magnet used in the variable magnetic flux motor only via the aging treatment. That is, the major adjustment of the coercivity is entrusted to the composition (the adjustment of the Y amount) and the aging treatment process remains in a level of minor adjustment of the coercivity. In this way, the permanent magnet with a high residual magnetic flux density and a low coercivity which is suitably used as the variable magnet for the variable magnetic flux motor can be obtained by relatively easy preparation processes.

EXAMPLES

Hereinafter, the present invention will be further described based on the examples and comparative examples. However, the present invention is not limited to the examples described below.

Specified amounts of the metal Nd, the metal Y, the metal La, the metal Ce, the electrolytic iron and ferro-boron were weighed by which a composition of the main phase grains of $(R1_{1-x}R2_x)_2T_{14}B$ (R1=Nd or Pr, R2=Y, La or Ce, T=Fe, x=0.0 to 1.0) can be obtained, and a sheet-like alloy was obtained via the strip casting method. The alloy was subjected to a hydrogen adsorbing process which was performed at an atmosphere with the partial pressure of hydrogen $P_{HD}$ being 10 to 100 kPa at a temperature for hydrogen adsorbing $T_{HD}$ of 500 to 800° C. for 1 hour. After the hydrogen adsorbing process, a hydrogen-releasing process was performed under vacuum at a temperature for hydrogen-releasing $T_{DR}$ of 800° C. for 1 hour. Next, the alloy after the hydrogen-releasing process was subjected to a hydrogen adsorbing process again which was performed at an atmosphere with the partial pressure of hydrogen $P_{AB}$ controlled to be 1 MPa at a temperature for hydrogen adsorbing $T_{AB}$ of −50° C. for 3 hours. Further, as the alloy raw material after the hydrogen adsorbing process had been pulverized to have a particle size of several hundreds of microns, the coarse pulverization process was omitted here. Oleamide of 0.1 wt % was added as the lubricant, and then finely pulverized powder with an average particle size of 3 µm was obtained by using a jet mill at an Ar atmosphere. The finely pulverized powder was filled into a mold (with an opening size of 20 mm×18 mm), and subjected to uniaxial pressing molding with a pressure of 2.0 ton/cm² under a magnetic field (2T) applied in a direction perpendicular to the pressing direction. The obtained molded body was heated to the sintering temperature $T_S$ of 1090° C. and was kept for 4 hours. Then, it was cooled down to room temperature. Thereafter, an aging treatment was provided in which a primary treatment lasted for 1 hour at a temperature $T_1$ of 850° C. and a secondary treatment lasted for 1 hour at a temperature $T_2$ of 530° C. were performed, so that a sintered body was obtained.

The magnetic properties of the sintered article were measured by a BH tracer. External magnetic fields sufficient to magnetically saturate the sintered article were applied in the positive direction and the negative direction so as to provide a magnetization-magnetic field curve (major loop). Based on this, the residual magnetic flux density Br and the coercivity HcJ were calculated. Then, an external magnetic field sufficient to magnetically saturate the sintered article was applied in the positive direction and then a specified magnetic field was applied in the negative direction. Then, a magnetic field sufficient to magnetically saturate the sintered article was applied in the positive direction so as to provide another magnetization-magnetic field curve (minor loop). Repeated measurements were provided with the specified magnetic field applied in the negative direction increased gradually so as to find out the external magnetic field Hex when the residual magnetic flux density Br became 0. Further, an external magnetic field equivalent to 0.95 HcJ was applied in the positive direction, and the residual magnetic flux density Br2 was obtained after the external magnetic field was removed.

The mainly generated phase in the sintered article was confirmed to be the tetragonal $R_2T_{14}B$ via X-ray diffraction. Then, the vicinity around the center of the main phase grains were analyzed by an energy dispersive spectroscopy (EDS) equipped on a scanning transmission electron microscope (STEM), and the composition of the main phase grains was quantified.

Examples 1 to 6 and Comparative Examples 1 to 5

When Nd was used as R1 and Y was used as R2 in the composition of the main phase grains $(R1_{1-x}R2_x)_2T_{14}B$ (x=0.0 to 1.0), as the replacement amount x of Y relative to Nd increased, only the coercivity HcJ was reduced while the residual magnetic flux density Br was substantially maintained. Further, when x was 0.2 or more, a coercivity of 400 kA/m or less could be obtained which is suitable for the use of the variable magnet in the variable magnetic flux motor. However, if x exceeded 0.7, the residual magnetic flux density Br decreased significantly and the magnetic flux obtained as the magnet for the motor also decreased. In other words, it could be seen that when x was in the range of 0.2≤x≤0.7, a permanent magnet with a high residual magnetic flux density and a low coercivity could be provided which was suitably used as the variable magnet for the variable magnetic flux motor. On the other hand, it could be seen that when x was within the range mentioned above, a permanent magnet could be obtained, in which the ratio Hex/HcJ of the external magnetic field Hex required for obtaining a residual magnetic flux density Br of 0 to the coercivity HcJ was 1.10 or less, and the ratio Br2/Br of the residual magnetic flux density Br2 to the residual magnetic flux density Br was 0.90 or more, wherein the residual magnetic flux density Br2 was obtained after applying the external magnetic field of Hex and then applying an external magnetic field of 0.95 HcJ. Such a permanent magnet was suitably used as the variable magnet for the variable magnetic flux motor and its magnetization state could be controlled by a small external magnetic field.

Example 3 and Examples 7 to 8

In the composition of the main phase grains $(R1_{1-x}R2_x)_2T_{14}B$ (x=0.4) when Nd and Pr were used as R1 and Y was used as R2, being independent of the percentages of Nd and Pr in R1, an effectiveness of only decreasing the coercivity HcJ while substantially maintaining of the residual magnetic flux density Br can be obtained by the replacement with Y. Further, the ratio Hex/HcJ of the external magnetic field Hex required for obtaining a residual magnetic flux density Br of 0 to the coercivity HcJ and the ratio Br2/Br of the residual magnetic flux density Br2 to the residual magnetic flux density Br was almost remained constant independent of the percentages of Nd and Pr in R1, wherein the residual magnetic flux density Br2 was obtained after applying the external magnetic field of Hex and then applying an external magnetic field of 0.95 HcJ. Thus, it could be seen that in the R-T-B based permanent magnet characterized in containing main phase grains with a composition of $(R1_{1-x}R2_x)_2T_{14}B$ (R2 represented the element(s) containing at least one selected from the group consisting of Y, La and Ce), even if R1 is composed of element(s) other than Nd, a permanent magnet suitably used as the variable magnet for the variable magnetic flux motor could also be obtained.

Example 3 and Examples 9 to 12

In the composition of the main phase grains $(R1_{1-x}R2_x)_2T_{14}B$ (x=0.4) when Nd was used as R1 and Y, Ce and La was used as R2, being independent of the percentages of Y, Ce and/or La in R2, an effectiveness of only decreasing the coercivity HcJ while substantially maintaining of the residual magnetic flux density Br can be obtained. Further, the ratio Hex/HcJ of the external magnetic field Hex required for obtaining a residual magnetic flux density Br of 0 to the coercivity HcJ and the ratio Br2/Br of the residual magnetic flux density Br2 to the residual magnetic flux density Br was almost remained constant independent of the percentages of Y, Ce and/or La in R2, wherein the residual magnetic flux density Br2 was obtained after applying the external magnetic field of Hex and then applying an external magnetic field of 0.95 HcJ. Thus, it could be seen that in the R-T-B based permanent magnet characterized in containing main phase grains with a composition of $(R1_{1-x}R2_x)_2T_{14}B$ (R1 represented rare earth element(s) composed of at least one selected from the group consisting of Pr, Nd, Sm, Eu, Gd, Tb, Dy, Ho, Er, Tm, Yb and Lu), if R2 is the element(s) containing at least one selected from the group consisting of Y, La and Ce, a permanent magnet suitably used as the variable magnet for the variable magnetic flux motor could be obtained.

TABLE 1

| | Composition | R1 | R1 at % | R2 | R2 at % | Br T | HcJ kA/m | the external magnetic field required for obtaining a residual magnetic flux density Br of 0 — Hex kA/m | Hex/HcJ — | Residual magnetic flux density after remagnetization via an external magnetic field of 0.95 HcJ — Br2 T | Br2/Br — |
|---|---|---|---|---|---|---|---|---|---|---|---|
| Example 1 | $(Nd_{0.8}Y_{0.2})_2Fe_{14}B$ | Nd | 80 | Y | 20 | 1.347 | 487 | 534 | 1.10 | 1.321 | 0.981 |
| Example 2 | $(Nd_{0.7}Y_{0.3})_2Fe_{14}B$ | Nd | 70 | Y | 30 | 1.329 | 219 | 240 | 1.10 | 1.292 | 0.972 |
| Example 3 | $(Nd_{0.6}Y_{0.4})_2Fe_{14}B$ | Nd | 60 | Y | 40 | 1.338 | 116 | 127 | 1.09 | 1.280 | 0.957 |
| Example 4 | $(Nd_{0.5}Y_{0.5})_2Fe_{14}B$ | Nd | 50 | Y | 50 | 1.280 | 144 | 157 | 1.09 | 1.198 | 0.936 |
| Example 5 | $(Nd_{0.4}Y_{0.6})_2Fe_{14}B$ | Nd | 40 | Y | 60 | 1.268 | 121 | 129 | 1.07 | 1.170 | 0.923 |
| Example 6 | $(Nd_{0.3}Y_{0.7})_2Fe_{14}B$ | Nd | 30 | Y | 70 | 1.249 | 107 | 112 | 1.05 | 1.134 | 0.908 |
| Example 7 | $(Nd_{0.3}Pr_{0.3}Y_{0.4})_2Fe_{14}B$ | Nd, Pr | 60 | Y | 40 | 1.365 | 144 | 150 | 1.04 | 1.295 | 0.949 |
| Example 8 | $(Pr_{0.6}Y_{0.4})_2Fe_{14}B$ | Pr | 60 | Y | 40 | 1.369 | 201 | 221 | 1.10 | 1.302 | 0.951 |
| Example 9 | $(Nd_{0.6}Y_{0.2}Ce_{0.2})_2Fe_{14}B$ | Nd | 60 | Y, Ce | 40 | 1.321 | 125 | 137 | 1.10 | 1.282 | 0.970 |
| Example 10 | $(Nd_{0.6}Ce_{0.4})_2Fe_{14}B$ | Nd | 60 | Ce | 40 | 1.249 | 134 | 141 | 1.05 | 1.201 | 0.962 |
| Example 11 | $(Nd_{0.6}Y_{0.2}La_{0.2})_2Fe_{14}B$ | Nd | 60 | Y, La | 40 | 1.311 | 111 | 122 | 1.10 | 1.271 | 0.969 |
| Example 12 | $(Nd_{0.6}La_{0.4})_2Fe_{14}B$ | Nd | 60 | La | 40 | 1.266 | 109 | 118 | 1.08 | 1.203 | 0.950 |
| Comparative Example 1 | $Nd_2Fe_{14}B$ | Nd | 100 | — | 0 | 1.379 | 927 | 2146 | 2.32 | 1.371 | 0.994 |
| Comparative Example 2 | $(Nd_{0.9}Y_{0.1})_2Fe_{14}B$ | Nd | 90 | Y | 10 | 1.362 | 723 | 1021 | 1.41 | 1.355 | 0.995 |
| Comparative Example 3 | $(Nd_{0.2}Y_{0.8})_2Fe_{14}B$ | Nd | 20 | Y | 80 | 1.221 | 99 | 102 | 1.03 | 1.049 | 0.859 |
| Comparative Example 4 | $(Nd_{0.1}Y_{0.9})_2Fe_{14}B$ | Nd | 10 | Y | 90 | 1.213 | 74 | 75 | 1.01 | 0.998 | 0.823 |
| Comparative Example 5 | $Y_2Fe_{14}B$ | — | 0 | Y | 100 | 1.202 | 71 | 72 | 1.01 | 0.973 | 0.809 |

As described above, the R-T-B based permanent magnet of the present invention has a high residual magnetic flux density and its magnetic force can reversibly changed via a small external magnetic field. Thus, such a permanent magnet can be suitably used as a magnet with variable magnetic force for a variable magnetic flux motor which can provide a high efficiency in the operation of consumer, industries and transportation equipments where variable speed is needed.

What is claimed is:

1. An R-T-B based permanent magnet, wherein:
   a ratio (Hex/HcJ) of the external magnetic field of Hex to the coercivity (HcJ) is 1.10 or less, and the residual magnetic flux density of Br2 satisfies the relationship of Br2/Br≥0.90, where:
   Hex is the external magnetic field required for obtaining a residual magnetic flux density Br of 0,
   Br2 is the residual magnetic flux density obtained after applying the external magnetic field of Hex, then applying an external magnetic field of 0.95 HcJ,
   the residual magnetic flux density Br is 1.2 T or more, and the coercivity (HcJ) is less than 640 kA/m.

2. The R-T-B based permanent magnet of claim 1, comprising:
   main phase grains with a composition of $(R1_{1-x}R2_x)_2T_{14}B$, wherein:
   R1 is rare earth element(s) composed of one or more elements selected from the group consisting of Pr, Nd, Sm, Eu, Gd, Tb, Dy, Ho, Er, Tm, Yb and Lu; and
   R2 is element(s) containing at least one selected from the group consisting of Y, La and Ce;
   T is one or more transition metal elements including Fe or a combination of Fe and Co; and
   0.2≤x≤0.7.

3. A rotating machine comprising the R-T-B based permanent magnet of claim 1.

4. A rotating machine comprising the R-T-B based permanent magnet of claim 2.

5. The R-T-B based permanent magnet of claim 1, wherein the coercivity (HcJ) is 487 kA/m or less.

6. A rotating machine comprising the R-T-B based permanent magnet of claim 5.

* * * * *